United States Patent
Schilling

(10) Patent No.: US 6,206,631 B1
(45) Date of Patent: Mar. 27, 2001

(54) TURBOMACHINE FAN CASING WITH DUAL-WALL BLADE CONTAINMENT STRUCTURE

(75) Inventor: Jan C. Schilling, Middletown, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/390,877

(22) Filed: Sep. 7, 1999

(51) Int. Cl.$^7$ .................................................. F01D 25/24
(52) U.S. Cl. ........................ 415/9; 415/173.4; 415/215.1
(58) Field of Search .................... 415/9, 173.1, 173.4, 415/200, 214.1, 215.1

(56) References Cited

U.S. PATENT DOCUMENTS

| 4,534,698 | * | 8/1985 | Tomich ..................................... 415/9 |
| 4,648,795 | * | 3/1987 | Lardellier .............................. 415/196 |
| 5,431,532 | * | 7/1995 | Humke et al. ............................ 415/9 |
| 5,437,538 | * | 8/1995 | Mitchell ..................................... 415/9 |
| 5,486,086 | * | 1/1996 | Bellia et al. .............................. 415/9 |

FOREIGN PATENT DOCUMENTS

1466385 * 3/1977 (GB) ....................................... 415/9

* cited by examiner

*Primary Examiner*—Edward K. Look
*Assistant Examiner*—Liam McDowell
(74) *Attorney, Agent, or Firm*—Andrew C. Hess; Nathan D. Herkamp

(57) ABSTRACT

A blade containment structure for turbomachinery, such as a high bypass turbofan engine. The blade containment structure includes a first casing member having a wall that defines an inner containment shell that immediately surrounds the blades of the turbomachine, and a second casing member assembled to the first casing member. The second casing member has a wall that defines an outer containment shell that surrounds the inner containment shell, such that a cavity is defined by and between the inner and outer containment shells. The first casing member is formed from a high-toughness material such as steel or a nickel-base alloy, while the second casing member is formed from a lower-weight and potentially lower-toughness material as compared to the material of the first casing member.

30 Claims, 4 Drawing Sheets

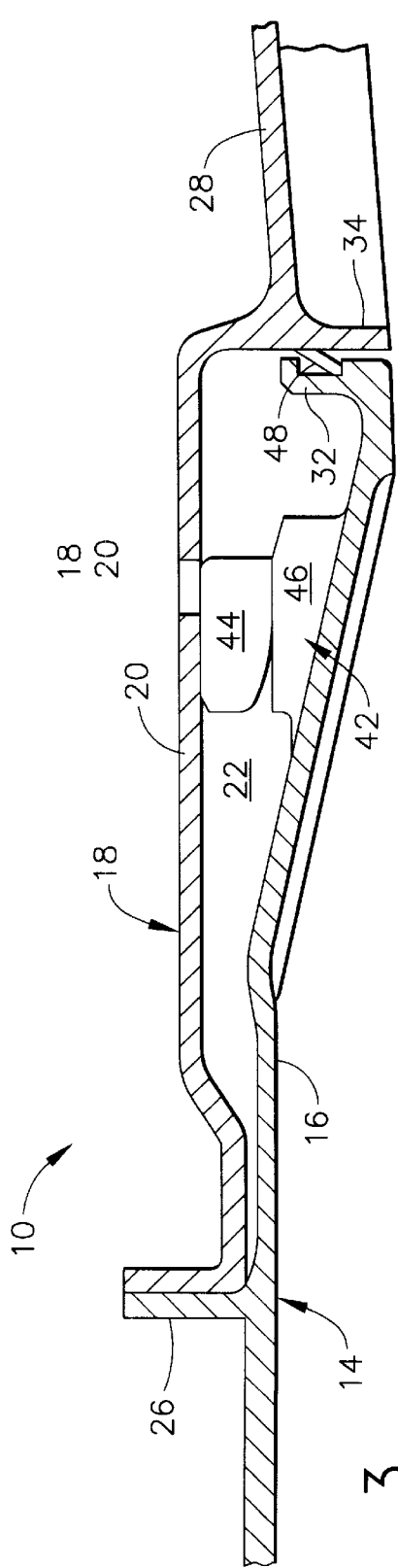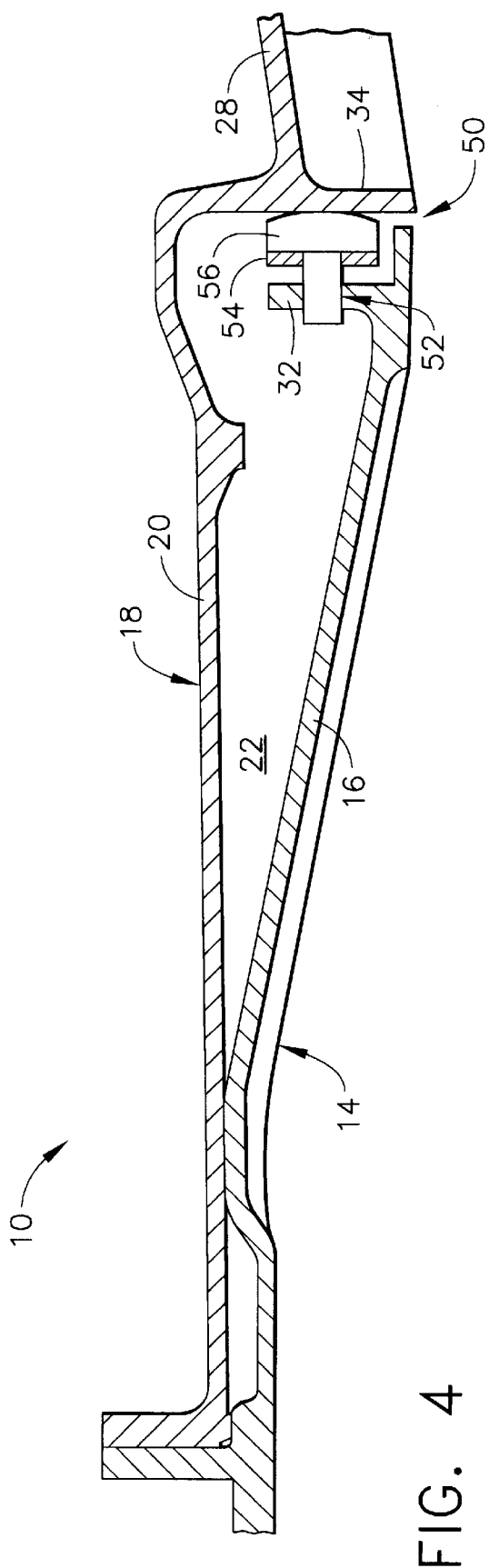

US 6,206,631 B1

TURBOMACHINE FAN CASING WITH DUAL-WALL BLADE CONTAINMENT STRUCTURE

FIELD OF THE INVENTION

The present invention relates to turbomachinery and blade containment structures for minimizing structural damage due to blade release. More particularly, this invention relates to a dual-wall containment casing for turbomachinery, such as a high bypass turbofan engine, in which the casing has a multi-component construction of different materials and is configured to benefit from the different mechanical and physical properties of the materials.

BACKGROUND OF THE INVENTION

High bypass turbofan engines are widely used for high performance aircraft that operate at subsonic speeds. These engines have a large fan placed at the front of the engine to produce greater thrust and reduce specific fuel consumption. The fan serves to compress incoming air, a portion of which is then delivered to the combustion chamber, with a larger portion being bypassed to the rear of the engine to generate additional engine thrust. The fan is circumscribed by a fan casing that must be capable of containing and minimizing damage to the engine from the remote event of a fan blade that is released from its hub during engine operation. For this reason, fan casings are equipped with specialized blade containment structures that serve to minimize structural damage to the engine as well as the aircraft to which the engine is mounted.

Various materials and configurations for blade containment structures have been proposed. Steel is well suited for blade containment on the basis of its mechanical properties, and particularly its toughness (strain to failure). However, a significant drawback to the use of steel in aerospace applications is its density. Consequently, thin steel containment structures coupled with a wrap formed of KEVLAR® or another fiber-reinforced polymer material have been developed. While reducing weight, these containment structures are characterized by significantly higher manufacturing costs. Containment structures formed of relatively lightweight metals such as aluminum alloys have also been used, though they do not provide the level of high toughness and other desirable mechanical properties possible with steel.

An additional consideration for blade containment structures is the natural frequency of the casing and the avoidance of blade/case interaction. The frequency of steel containment structures has typically been increased above blade/case interaction frequencies by the inclusion of rings that are integral with or bolted to the structure. Frequency-altering measures such as integral or bolt-on rings have also been required with aluminum containment structures. For steel containment structures coupled with fiber-reinforced polymer wraps, a honeycomb structure between the steel component and the wrap has been used to increase the natural frequency of the casing assembly. In addition to additional material, and manufacturing and assembly costs, each of the above modifications for addressing blade/case interaction incurs the penalty of unwanted weight, space and cost.

From the above, it can be seen that improvements in blade containment through material selection based on mechanical properties and the structural requirements for avoiding blade/case interaction have combined to increase the weight and cost of manufacturing high bypass turbofan engines. It would be desirable if a blade containment structure were available that exhibited the blade containment capabilities of steel casings but without the weight penalty associated with steel, while also maintaining fan casing natural frequencies at acceptable margins to avoid blade/case interactions.

BRIEF SUMMARY OF THE INVENTION

According to the present invention, there is provided a blade containment structure for a fan casing of turbomachinery, such as a high bypass turbofan engine. The blade containment structure of this invention includes a first casing member having a wall that defines an inner containment shell immediately surrounding the blades of the turbomachine, and a second casing member assembled to the first casing member. The second casing member has a wall that defines an outer containment shell surrounding the inner containment shell of the first casing member, such that a cavity is defined by and between the inner and outer containment shells. According to the invention, the first casing member is formed from a relatively tough material such as a stainless steel or a nickel-base alloy, while the second casing member is formed from a material that is less dense than the material of the first casing member. The material of the second casing member may also have lower toughness as compared to the material of the first casing member.

The overlapping portions of the first and second casing members provide for a multi-component containment structure whose ability to contain a released blade benefits from the toughness of the first casing member immediately adjacent the blades. Simultaneously, the containment structure benefits from the relatively low weight of the second casing member, which preferably forms the balance of the containment structure such that the overall weight of the fan casing is significantly lower than that possible if the entire containment structure was formed of the material of the first casing member. The overlapping portions of the first and second casing members also provide a load path if the first casing member is torn on blade impact, and the cavity defined by the overlapping portions can be sized and configured to accommodate a variety of devices that provide positive damping between the casing members to react any case vibrational interaction with the blades.

Other objects and advantages of this invention will be better appreciated from the following detailed description.

BRIEF DESCRIPTION OF THE DRAWINGS

FIGS. 3 and 4 are alternative damping devices illustrated with the blade containment structure of FIG. 1.

DETAILED DESCRIPTION OF THE INVENTION

Figure 1:
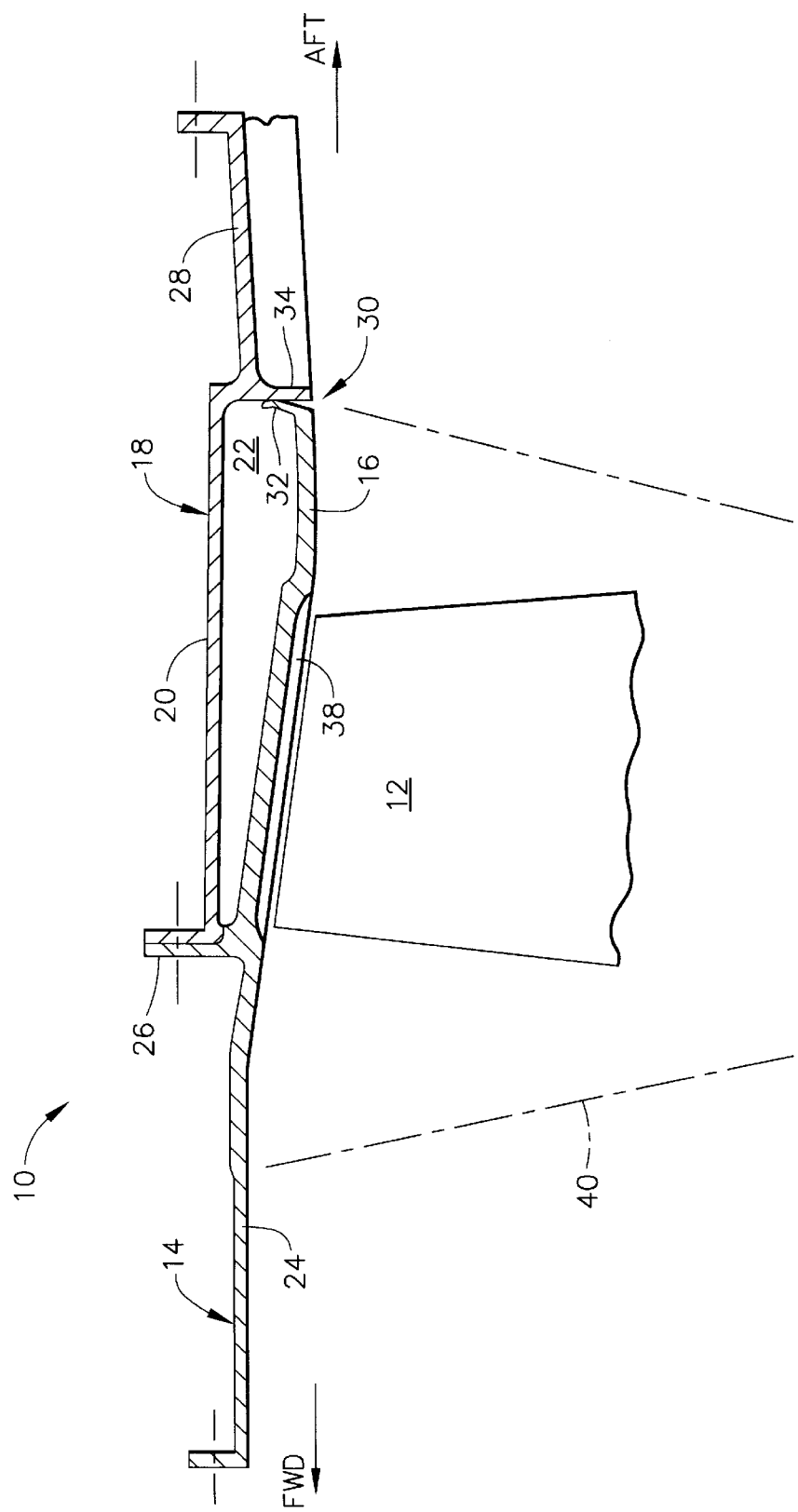
FIGS. 1 and 2 represent partial cross-sectional views of fan casings of a high bypass turbofan engine equipped with blade containment structures in accordance with two embodiments of this invention.

The present invention provides blade containment structures for use in turbomachinery, and particularly high bypass turbofan engines. As represented in FIG. 1, an annular-shaped blade containment casing 10 is shown as having a two-piece construction that surrounds fan blades 12 of the fan section of an engine. The casing 10 is composed of annular-shaped forward and aft casings 14 and 18, respectively, having wall portions that overlap each other in the vicinity of the blades 12. The overlap provides a dual-wall construction that promotes the ability of the casing 10 to withstand a localized maximum impact from a fan blade 12 released from its hub (not shown) by distributing the impact of the blade 12, so as to reduce the likelihood of engine damage.

In FIG. 1, the overlapping portions of the forward and aft casings 14 and 18 are designated as inner and outer shells 16 and 20, respectively, which define an annular-shaped cavity 22 therebetween. Because of the proximity of the blade tips to the inner shell 16, the fan blades 12 may rub the inner shell 16 during hard aircraft landings or maneuvers. As is generally conventional, a portion of the inner shell 16 immediately adjacent the blade tips is provided with an abradable material 38, such that the abradable material 38 will sacrificially abrade away when rubbed by the fan blades 12. The inner shell 16 is generally delineated from an axially forward section 24 of the forward casing 14 by a flange 26, to which the aft casing 18 is secured by any suitable means, such as fasteners (not shown). The aft end of the forward casing 14 is shown as terminating with a friction damper 30 composed of an annular rim or flange 32 that is preloaded against an annular shoulder 34 of the aft casing 18, beyond which an aft end 28 of the aft casing 18 extends. The degree to which the flange 32 is deformed to generate a desirable level of friction damping with the shoulder 34 will depend on the natural frequencies of the blades 12 and the containment casing 10, as well as geometric blade/casing interfaces which generate high radial loading, and can generally be appropriately estimated by those skilled in the art.

As seen from FIG. 1, the overlapping inner and outer shells 16 and 20 surround a region 40 within the casing 10 that a blade is typically propelled if released. Consequently, the dual-wall section formed by the inner and outer shells 16 and 20 must be capable of withstanding impact from a released blade 12. A key aspect of this invention is that the inner and outer shells 16 and 20 are formed of different materials, with the inner shell 16 being formed of a relatively tough material, while the outer shell 20 is formed of a lighter-weight material that can have lower toughness as compared to the inner shell 16. Suitable high-toughness materials for the inner shell 16 include steel alloys such as 304SS stainless steel that preferably exhibit a modulus of toughness on the order of about 36 ksi (about 250 MPa). In contrast, suitable materials for the outer shell 20 include aluminum and its alloys, such as 2029 or 6061, whose densities are significantly less than steel and have a modulus of toughness of about 6 ksi (about 40 MPa). In the embodiment of FIG. 1, the inner and outer shells 16 and 20 are formed as integral parts of the forward and aft casings 14 and 18, such that the entire forward casing 14 is formed of the same high-toughness material and the entire aft casing 18 is formed of the same lightweight material. Notably, the thicknesses of the inner and outer shells 16 and 20 are shown as being approximately equal, generally on the order of about 4 to about 9 mm in thickness, more preferably about 5 to about 6 mm in thickness. Generally, the thickness of the inner shell 16 may be equivalent to that of a prior steel casing, while the thickness of the outer shell 20 may be 85% or less of that required for prior aluminum casings. As a result, the present invention significantly reduces the overall weight of the casing 10 as compared to all-aluminum casings, and also incurs lower costs as compared to all-steel casings since a lower cost material can be substituted for steel for the aft casing 18.

With the blade containment casing 10 described above, the high-toughness inner shell 16 will bear the brunt of impact in the event that a fan blade 12 is released. A portion of the impact load is distributed to the lighter-weight outer shell 20 through the flange 26 and the friction damper 30, the latter of which will also absorb and dissipate some of the impact force to further minimize damage to the casing 10 and engine. Consequently, the casing it is configured to benefit from the toughness of the material used to form the inner shell 16, yet also has the advantage of reduced weight as a result of the lighter-weight material used to form the aft casing 18. As a result of being shielded by the inner shell 16, the toughness of the aft casing 18 is less critical, permitting the use of materials whose toughness can be significantly less than that of the inner shell 16.

Figure 2:
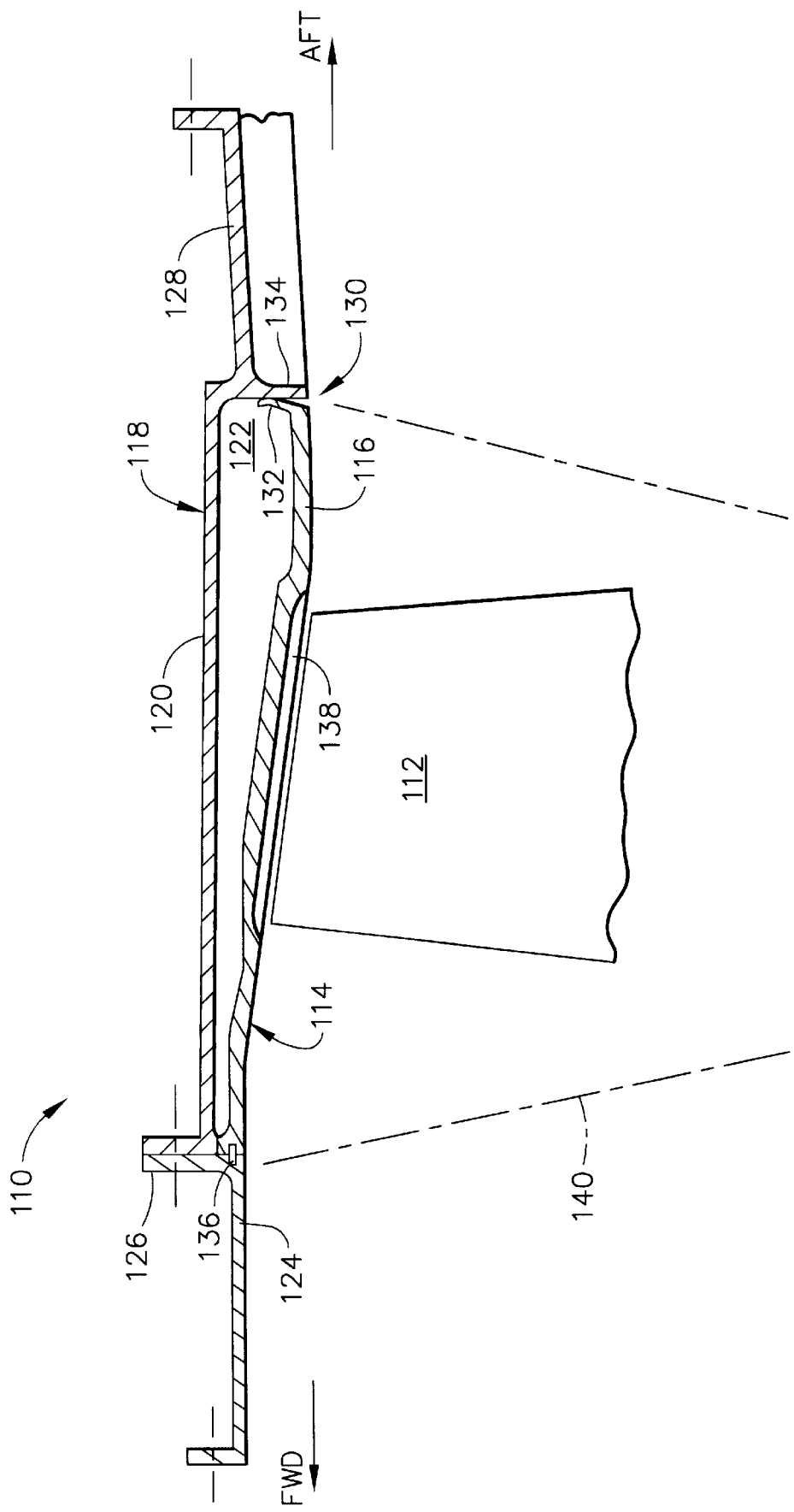

FIG. 2 illustrates a blade containment casing 110 having a three-piece construction in accordance with a second embodiment of the invention. As with the casing 10 of FIG. 1, the casing 110 surrounds the fan blades 112 of a turbofan engine fan section, and is composed of forward and aft casings 114 and 118, respectively, which define overlapping inner and outer shells 116 and 120. The blades 112 are surrounded by the dual-wall construction provided by the inner and outer shells 116 and 120, which also define an annular-shaped cavity 122. As with the embodiment of FIG. 1, the inner shell 116 is provided with a sacrificial abradable material 138 for rub encounters with the fan blades 112. Also similar to the embodiment of FIG. 1, the casing 110 includes a friction damper 130 composed of an annular rim or flange 132 that is preloaded against an annular shoulder 134 of the aft casing 118, beyond which an aft end 128 of the aft casing 118 extends.

The casing 110 differs from that of FIG. 1 by the configuration of the forward casing 114 and the inclusion of a separate forward casing end 124 in lieu of the integral forward section 24 of FIG. 1. The forward casing end 124 has a flange 126 that is secured by fasteners (not shown) or other suitable means to the aft casing 118, and is also secured to the fore end of the forward casing 114 by an anti-rotation device 136, such as axial-oriented shear pins. A key advantage of this embodiment is that the weight of the casing 110 can be further reduced by forming the forward casing end 124 of the same or similar lighter-weight material used to form the aft casing 118, e.g., aluminum alloy, while the forward casing 114 is again formed of a relatively high-toughness material such as steel. The thicknesses of the inner and outer shells 116 and 120 are again shown to have approximately equal thicknesses.

Figure 5:
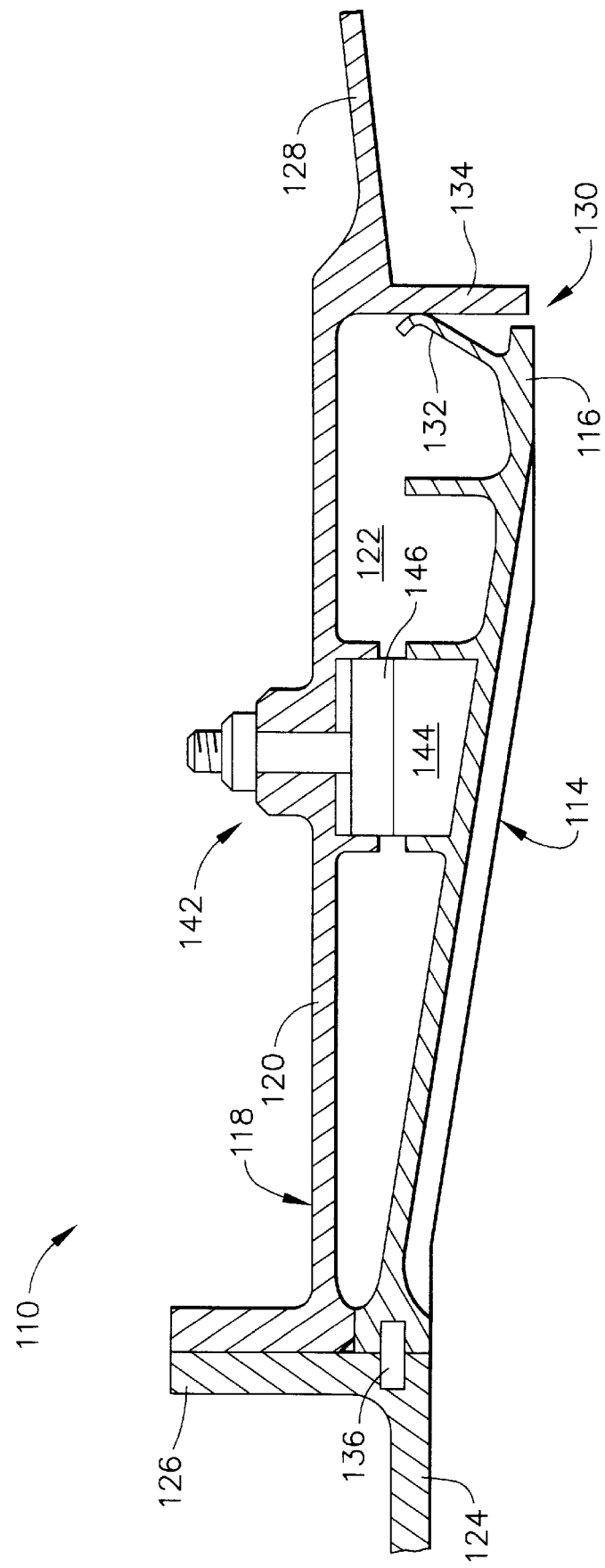
FIG. 5 is a damping device illustrated with the blade containment structure of FIG. 2.

FIGS. 3, 4 and 5 serve to illustrate alternative or supplemental damping devices that can be employed with the casings 10 and 110 of this invention. The damping devices of FIGS. 3 and 4 are illustrated with the blade containment casing 10 of FIG. 1, while the damping device of FIG. 5 is illustrated with the casing 110 of FIG. 2, though any one or more of the damping devices could be adapted for use with either casing 10 and 110.

In FIG. 3, a damping device 42 is shown as including an elastomeric pad 44 within the cavity 22 and radially abutting a stepped surface 46 of the inner shell 16. The casing 10 is also equipped with an elastomeric pad 48 between the flange 32 of the inner shell 16 that is preloaded against the shoulder 34 of the aft casing 18. In FIG. 4, elastomeric damping is achieved with a damping device 50 composed of a pin 52 mounted to the flange 32 of the inner shell 16 and abutting the shoulder 34 of the aft casing 18. A spring 54 is mounted on the pin 52 between the flange 32 and the head 56 of the pin 52 to provide damping between the forward and aft casings 14 and 18.

Finally, FIG. 5 illustrates the casing 110 equipped with the friction damping device 130 of FIG. 2, and further equipped with an elastomeric damping device 142 composed of an elastomeric bumper 144 mounted on an adjustable pin 146 within the cavity 122. The bumper 144 abuts the outward surface of the inner shell 116, and absorbs vibration as well as helps distribute impact loads during blade release.

While the invention has been described in terms of certain embodiments, it is apparent that other forms could be adopted by one skilled in the art. In addition, it is foreseeable that the invention could be adapted for use in turbomachinery other than high bypass turbofan engines. Accordingly, the scope of the invention is to be limited only by the following claims.

What is claimed is:

1. A blade containment structure of a turbomachine having a plurality of blades circumscribed by the blade containment structure, the blade containment structure comprising:
    a first casing member having a wall that defines an inner containment shell immediately surrounding the blades within the blade containment structure, the first casing member being formed from a first material;
    a second casing member assembled to the first casing member, the second casing member having a wall that defines an outer containment shell surrounding the inner containment shell, the second casing member having an aft wall that does not surround the inner containment shell of the first casing member, the second casing member being formed from a second material that is lower in density than the first material of the first casing member; and
    a cavity defined by and between the inner and outer containment shells.

2. A blade containment structure according to claim 1, wherein the first casing member is formed of steel and the second casing member is formed of aluminum or an aluminum alloy.

3. A blade containment structure according to claim 1, wherein the first casing member further has a forward wall that does not surround the blades and is not surrounded by the second casing member.

4. A blade containment structure according to claim 3, wherein the first casing member further has a flange between the forward wall and the inner containment shell, the second casing member being secured to the first casing member at the flange.

5. A blade containment structure according to claim 1, further comprising a forward casing member that does not surround the blades and is not surrounded by the second casing member, the forward casing member being formed of a material having lower toughness than the first material of the first casing member.

6. A blade containment structure according to claim 1, wherein the turbomachine has a blade release region into which the blades are propelled if released, and the outer containment shell of the second casing member is shielded from blade release by the inner containment shell of the first casing member throughout the blade release region.

7. A blade containment structure according to claim 1, further comprising means for damping vibration of the blade containment structure.

8. A blade containment structure according to claim 7, wherein the damping means is a preloaded friction damper that damps vibration through rubbing contact between the first and second casing members.

9. A blade containment structure according to claim 1, further comprising an abradable material on an interior surface of the inner containment shell for rubbing encounters with the blades.

10. A blade containment structure according to claim 1, wherein the turbomachine is a high-bypass turbofan engine.

11. A fan blade containment structure of a high bypass turbofan engine having a plurality of radially-extending fan blades circumscribed by the blade containment structure, the blade containment structure comprising:
    an annular-shaped first casing member having a wall that defines an annular-shaped inner containment shell immediately surrounding the blades within the blade containment structure, the first casing member being formed from a first material;
    an annular-shaped second casing member assembled to the first casing member, the second casing member having a wall that defines an annular-shaped outer containment shell surrounding the inner containment shell, the second casing member being formed from a second material that is lower in both density and toughness than the first material of the first casing member;
    an annular-shaped cavity defined by and between the inner and outer containment shells; and
    means in physical communication with the first and second casing members for damping vibration of the blade containment structure.

12. A fan blade containment structure according to claim 11, wherein the first casing member is formed of steel and the second casing member is formed of aluminum or an aluminum alloy.

13. A fan blade containment structure according to claim 11, wherein the first casing member comprises:
    an axially forward wall that does not surround the blades and is not surrounded by the second casing member; and
    a flange between the forward wall and the inner containment shell, the second casing member being secured to the first casing member at the flange.

14. A fan blade containment structure according to claim 11, further comprising an axially forward casing member that does not surround the blades and is not surrounded by the second casing member, the forward casing member being assembled to the first and second casing members, the forward casing member being formed of aluminum or an aluminum alloy.

15. A fan blade containment structure according to claim 11, wherein the second casing member further has an axially aft wall that does not surround the inner containment shell of the first casing member.

16. A fan blade containment structure according to claim 11, wherein the damping means comprises a preloaded friction damper that damps vibration through rubbing contact between the first and second casing members.

17. A fan blade containment structure according to claim 16, wherein the preloaded friction damper comprises:
    a radially-extending annular-shaped flange defined at an axial end of the inner containment shell; and
    a radially-extending annular-shaped surface of the second casing member.

18. A fan blade containment structure according to claim 11, wherein the damping means comprises an elastomeric damper in physical communication with the inner and outer containment shells.

19. A fan blade containment structure according to claim 18, wherein the elastomeric damper is contained within the cavity.

20. A fan blade containment structure according to claim 11, further comprising an abradable material on the inner containment shell for rubbing encounters with the blades.

21. A blade containment structure of a turbomachine having a plurality of blades circumscribed by the blade containment structure, the blade containment structure comprising:
- a first casing member having a wall that defines an inner containment shell immediately surrounding the blades within the blade containment structure, the first casing member being formed from a first material;
- a second casing member assembled to the first casing member, the second casing member having a wall that defines an outer containment shell surrounding the inner containment shell, the second casing member being formed from a second material that is lower in density than the first material of the first casing member;
- a cavity defined by and between the inner and outer containment shells; and
- a preloaded friction damper that damps vibration of the blade containment structure through rubbing contact between the first and second casing members.

22. A blade containment structure according to claim 21, wherein the first casing member is formed of steel and the second casing member is formed of aluminum or an aluminum alloy.

23. A blade containment structure according to claim 21, wherein the first casing member further has a forward wall that does not surround the blades and is not surrounded by the second casing member.

24. A blade containment structure according to claim 23, wherein the first casing member further has a flange between the forward wall and the inner containment shell, the second casing member being secured to the first casing member at the flange.

25. A blade containment structure according to claim 21, further comprising a forward casing member that does not surround the blades and is not surrounded by the second casing member, the forward casing member being formed of a material having lower toughness than the first material of the first casing member.

26. A blade containment structure according to claim 21, wherein the second casing member further has an aft wall that does not surround the inner containment shell of the first casing member.

27. A blade containment structure according to claim 21, wherein the turbomachine has a blade release region into which the blades are propelled if released, and the outer containment shell of the second casing member is shielded from blade release by the inner containment shell of the first casing member throughout the blade release region.

28. A blade containment structure according to claim 21, further comprising an abradable material on an interior surface of the inner containment shell for rubbing encounters with the blades.

29. A blade containment structure according to claim 21, wherein the turbomachine is a high-bypass turbofan engine.

30. A blade containment structure according to claim 21, wherein the preloaded friction damper comprises an aft end of the first casing member that is preloaded against a shoulder of the second casing member.

* * * * *